United States Patent
Sano

(10) Patent No.: US 9,121,736 B2
(45) Date of Patent: Sep. 1, 2015

(54) VEHICLE METER

(71) Applicant: Japan Display Inc., Tokyo (JP)

(72) Inventor: Yutaka Sano, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 14/198,227

(22) Filed: Mar. 5, 2014

(65) Prior Publication Data

US 2014/0285334 A1 Sep. 25, 2014

(30) Foreign Application Priority Data

Mar. 19, 2013 (JP) ................................. 2013-056414

(51) Int. Cl.
*B60Q 1/00* (2006.01)
*G01D 13/10* (2006.01)
*B60K 35/00* (2006.01)
*B60K 37/02* (2006.01)

(52) U.S. Cl.
CPC ................ *G01D 13/10* (2013.01); *B60K 35/00* (2013.01); *B60K 37/02* (2013.01); *B60K 2350/1072* (2013.01); *B60K 2350/403* (2013.01); *B60K 2350/965* (2013.01)

(58) Field of Classification Search
CPC ..................................... G06K 9/00; B60K 1/00
USPC .................................. 340/461, 459, 438, 441
See application file for complete search history.

(56) References Cited

U.S. PATENT DOCUMENTS

| | | | |
|---|---|---|---|
| 5,757,268 A * | 5/1998 | Toffolo et al. ................. | 340/461 |
| 5,764,139 A * | 6/1998 | Nojima et al. ................. | 340/461 |
| 8,331,622 B2 * | 12/2012 | Itoh et al. ....................... | 382/104 |
| 2006/0092001 A1* | 5/2006 | Yokota et al. .............. | 340/425.5 |
| 2011/0260850 A1* | 10/2011 | Ringenwald .................. | 340/461 |

FOREIGN PATENT DOCUMENTS

JP 2007-218682 8/2007

* cited by examiner

*Primary Examiner* — Brent Swarthout
(74) *Attorney, Agent, or Firm* — K&L Gates LLP

(57) ABSTRACT

A vehicle meter includes a display device to display an image, an indicator needle disposed on an image display surface side and configured to rotate around one end thereof along the image display surface, a display control unit to switchably display one of a first image and a second image on the display device, each image including scale marks at the other end side of the indicator needle, the scale marks being displayed within a range in a circumferential direction of a predetermined circle centered at a rotational axis of the indicator needle, the second image having the range in the circumferential direction narrower than that of the first image, and an indicator needle control unit to control a range for rotating the indicator needle while the second image is displayed to be smaller than that while the first image is displayed.

3 Claims, 7 Drawing Sheets

VEHICLE METER

CROSS REFERENCES TO RELATED APPLICATIONS

The present application claims priority to Japanese Priority Patent Application JP 2013-056414 filed in the Japan Patent Office on Mar. 19, 2013, the entire content of which is hereby incorporated by reference.

BACKGROUND

1. Field of the Invention

The present disclosure relates to a vehicle meter provided with a display panel.

2. Description of the Related Art

In recent years, as a vehicle meter such as speedometer, tachometer, fuel gauge, or water temperature gauge, there is proposed a device in which an indicator needle is combined with a display panel such as liquid crystal display panel, in order to improve luxury taste or the like (for example, Japanese Patent Application Laid-open No. 2007-218682).

Japanese Patent Application Laid-open No. 2007-218682 describes a vehicle meter unit capable of switching a first display mode and a second display mode. In the first display mode, a meter indication value is displayed by means of a scale mark image displayed on a liquid crystal display (LCD) screen and an indicator needle mounted outside the LCD screen. In the second display mode, information other than the meter indication value is digitally displayed.

The inventor founds that the vehicle meter unit described in Japanese Patent Application Laid-open No. 2007-218682 has some features to be improved. Specifically, when the information other than the meter indication value is displayed, the indicator needle is retracted to outside of a display area of the LCD screen. Therefore, the user cannot view the meter indication value by means of the indicator needle, while the information other than the meter indication value is displayed.

SUMMARY

It is an object of the present invention to at least partially solve the problems in the conventional technology.

There is disclosed a vehicle meter including a display device configured to display an image, an indicator needle which is a rod-like member disposed on an image display surface side of the display device and which is configured to rotate around one end of the rod-like member along the image display surface, a display control unit configured to switchably display one of a first image and a second image on the display device, the first image and the second image each including a plurality of scale marks at the other end side of the rod-like member, the plurality of scale marks being displayed within a range in a circumferential direction of a predetermined circle centered at a rotational axis of the indicator needle, the second image having the range in the circumferential direction narrower than that of the first image, and an indicator needle control unit configured to control a range for rotating the indicator needle while the second image is displayed so as to be smaller than a range for rotating the indicator needle while the first image is displayed.

The above and other objects, features, advantages and technical and industrial significance of this invention will be better understood by reading the following detailed description of presently preferred embodiments of the invention, when considered in connection with the accompanying drawings.

The following description is only for illustrative purpose. Any change, rearrangement, modification or the like readily derived from or substantially equivalent with the present disclosure without departing from the spirit and scope of the invention is encompassed within the present invention. For better understanding of the disclosure, the accompanying drawings may be schematic and not to scale with actual width, thickness, shapes of individual elements or components in actual embodiments. In any case, the accompanying drawings are for illustrative purpose only and not to be construed as any limitation of the present disclosure. In the following description and drawings, the corresponding elements or components in the plurality of drawings carry the identical numeric references, and the redundant explanation may be omitted as appropriate.

Additional features and advantages are described herein, and will be apparent from the following Detailed Description and the figures.

DETAILED DESCRIPTION

The present disclosure will now be described according to the following orders and with reference to the accompanying drawings.

1. Embodiments
   1-1. General Configuration of Vehicle Meter
   1-2. Display Device
   1-3. Details of Meter Control Device
   1-4. Operation of Vehicle Meter
2. Configuration of the present disclosure

1. Embodiments

1-1. General Configuration of Vehicle Meter

Figure 1:
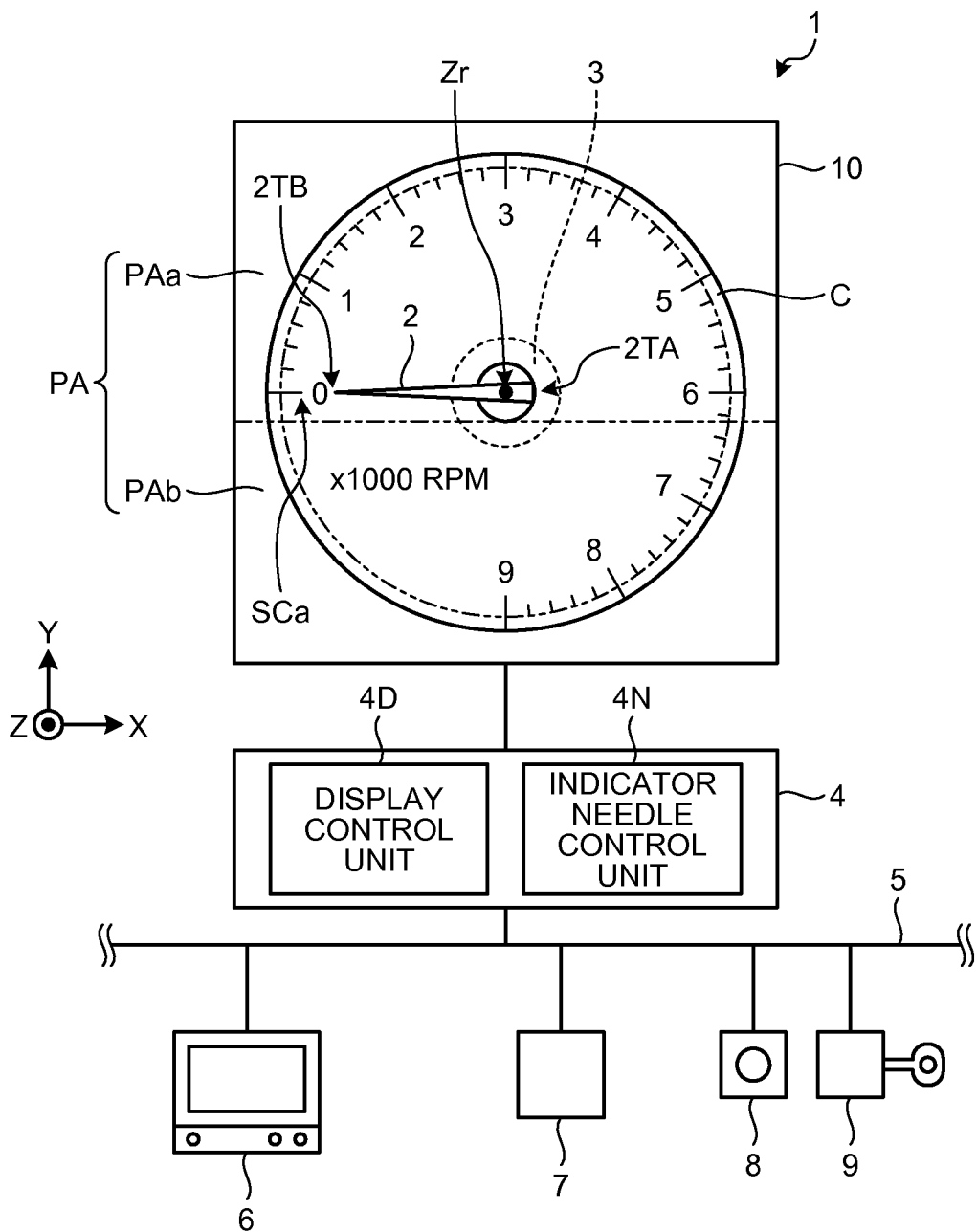
FIG. 1 is a schematic view illustrating a vehicle meter according to an embodiment illustrating the present disclosure.
Figure 2:
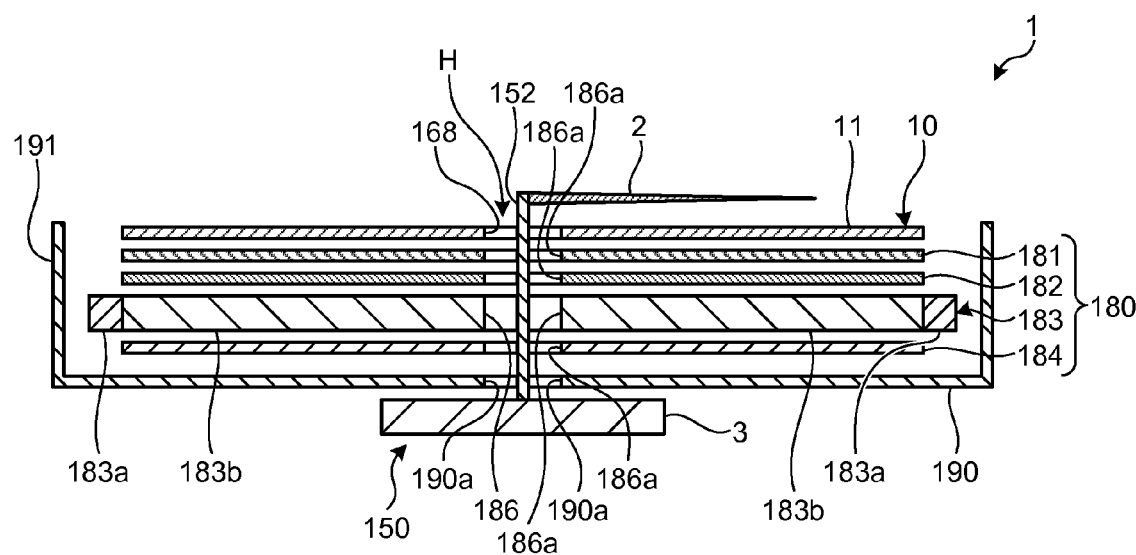
FIG. 2 is a cross-sectional view illustrating the vehicle meter according to the present embodiment.
Figure 3:
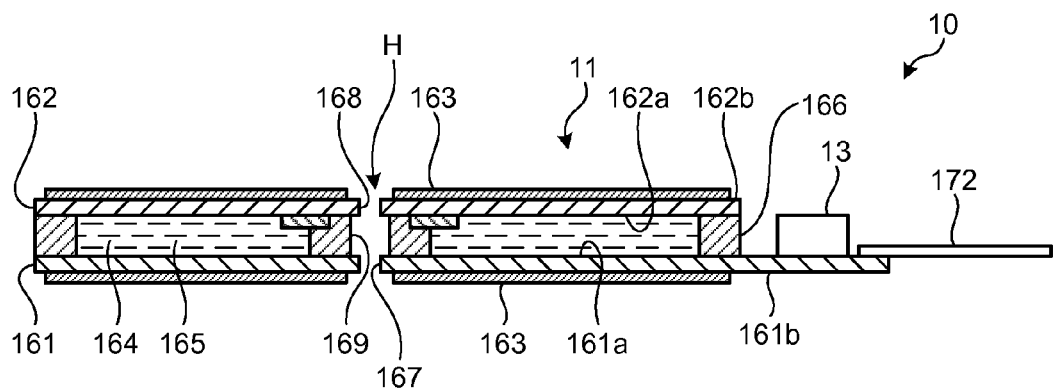
FIG. 3 is a cross-sectional view illustrating a display device included in the vehicle meter according to the present embodiment.

FIG. 1 is a schematic view illustrating a vehicle meter according to an embodiment illustrating the present disclosure. FIG. 2 is a cross-sectional view illustrating the vehicle meter according to the present embodiment. FIG. 3 is a cross-sectional view illustrating a display device included in the vehicle meter according to the present embodiment. A vehicle meter 1 is a device provided with an indicator needle 2 and a display device 10. The vehicle meter 1 is a device mounted on a vehicle such as car, bus, and truck, for displaying information about a running speed, a rotational speed of an engine, or the like, by means of a scale marks SCa displayed on the display device 10 and the indicator needle 2 to indicate the scale marks SCa.

As illustrated in FIG. 1, the vehicle meter 1 includes the display device 10, the indicator needle 2, and a meter control device 4. The meter control device 4 includes a display control unit 4D and an indicator needle control unit 4N. The display device 10 displays an image on an image display surface PA. The image display surface PA is a plane parallel to an X-Y plane defined by an X-Y orthogonal coordinate system. A direction orthogonal to the image display surface PA is a Z direction. In the present embodiment, the display device 10 is disposed so that one side thereof in the Y direction is disposed at an upper side when a user (e.g. a driver) views the display device 10. Hereinafter, one side of the display device 10 in the Y direction may be also called the upper direction and the other side of the display device 10 in the Y direction may be also called a lower direction. The image display surface PA has two display areas in the Y direction. The upper one of the two display areas is referred to as a first display area PAa and the lower one is referred to as a second display area PAb.

The indicator needle 2 is a rod-like member disposed on a side of the image display surface PA of the display device 10. The indicator needle 2 rotates around a side of one end 2TA thereof along the image display surface PA. In the present embodiment, an axis Zr (hereinafter, may be also called "rotational axis" as appropriate) around which the indicator needle 2 rotates is an axis orthogonal to the image display surface PA, that is, an axis parallel to the Z axis. The rotational axis Zr is not necessarily orthogonal to the image display surface PA, that is, not necessarily parallel to the Z axis and may be inclined relative to the Z axis. However, as an inclination angle of the rotational axis Zr becomes larger relative to the Z axis, the other end 2TB of the indicator needle 2 is more likely to interfere with the image display surface PA. Therefore, in a case where the rotational axis Zr is inclined relative to the Z axis, the inclination angle of the rotational axis Zr is determined not to interfere with the image display surface PA. The indicator needle 2 is rotated around the rotational axis Zr by a motor 3 serving as an actuator. The motor 3 is disposed on the opposite side of the display device 10 from the image display surface PA.

The meter control device 4 controls an operation of the indicator needle 2 and an image display on the image display surface PA of the display device 10. The display control unit 4D controls the image display on the image display surface PA, and the indicator needle control unit 4N controls the operation of the indicator needle 2. For example, the meter control device 4 may include a control circuit and a computer having a CPU (Central Processing Unit), a memory, and the like, but is not limited thereto.

The meter control device 4 is connected to an intra-vehicle communication line 5. Devices including a navigation device 6, various sensors 7, a selector switch 8, an ignition key 9 and the like are connected to the intra-vehicle communication line 5. The meter control device 4 obtains information via the intra-vehicle communication line 5 from the devices connected thereto.

The display control unit 4D of the meter control device 4 switches between a first image and a second image and displays one of the first and second images on the image display surface PA of the display device 10. The first image is an image including a plurality of scale marks SCa which are arrayed on the side of the other end 2TB of the indicator needle 2 in a range in a circumferential direction of a predetermined circle C centered at the rotational axis Zr of the indicator needle 2. That is, the first image is an image to display the scale marks SCa for the indicator needle 2. The predetermined circle C is a virtual circle centered at the rotational axis Zr. The second image is an image having a narrower range for displaying the plurality of scale marks SCa in the circumferential direction of the predetermined circle C in comparison to the first image.

The indicator needle control unit 4N of the meter control device 4 controls a range in which the indicator needle 2 rotates while the second image is displayed, so as to be narrower than a range in which the indicator needle 2 rotates while the first image is displayed. In the present embodiment, the indicator needle control unit 4N controls the range in which the indicator needle 2 rotates by controlling an operation of the motor 3. Hereinafter, a range in which the indicator needle 2 rotates may be also called a range for rotating the indicator needle 2.

As illustrated in FIG. 2, the display device 10 includes a display panel 11, a backlight 180 provided on a back surface side of the display panel 11, and a frame 190 to accommodate therein the display panel 11 and the backlight 180. In the present embodiment, the display panel 11 is a liquid crystal panel using thin film transistor (TFT) elements as drive elements.

As illustrated in FIG. 3, the display panel 11 includes a TFT substrate (a first substrate) 161 and an opposite substrate (a second substrate) 162. A liquid crystal area 165 obtained by sealing a liquid crystal 164 is formed between the TFT substrate 161 and the opposite substrate 162. The TFT elements, pixel electrodes, common electrodes, an orientation film, and the like (not illustrated) are provided on a main surface 161a of the TFT substrate 161 in a stacking manner. A polarization plate 163 is disposed on a back surface 161b of the TFT substrate 161. A flexible printed circuit (FPC) 172 and a driver integrated circuit (driver IC) 13 for driving the liquid crystal are also provided on the TFT substrate 161. Color filters, an orientation film, and the like (not illustrated) are provided on a main surface 162a of the opposite substrate 162 in a stacking manner. Another polarization plate 163 is disposed on a back surface 162b of the opposite substrate 162.

On either one of the main surface 161a of the TFT substrate 161 and the main surface 162a of the opposite substrate 162, a main seal 166 is formed to seal the liquid crystal 164 between the TFT substrate 161 and the opposite substrate 162. On either one of the main surface 161a of the TFT substrate 161 and the main surface 162a of the opposite substrate 612, a through hole seal 169 is also formed to seal the liquid crystal 164 between the TFT substrate 161 and the opposite substrate 162.

The display panel 11 is formed by bonding the TFT substrate 161 and the opposite substrate 162 together so that the main surface 161a and the main surface 162a face each other. In the display panel 11, the main seal 166 as a first seal member seals the liquid crystal 164 between the TFT substrate 161 and the opposite substrate 162, and thereby the liquid crystal area 165 is formed. Furthermore, in the display panel 11, the through hole seal 169 as a second seal member is formed in the liquid crystal area 165.

As illustrated in FIGS. 2 and 3, the display panel 11 has a through hole H passing through from the TFT substrate 161 to the opposite substrate 162. That is, the through hole H passes through the image display surface PA of the display device 10 illustrated in FIG. 1 and the opposite surface thereof. The through hole H is provided to pass through the through hole seal 169. In the through hole H, an inner diameter of a hole 167 provided in the TFT substrate 161 is smaller than an inner diameter of the through hole seal 169, and an inner diameter of a hole 168 provided in the opposite substrate 162 is smaller than the inner diameter of the through hole seal 169. Thereby, as illustrated in FIG. 3, the display panel 11 has a structure in which the peripheries of the through hole H in both substrates are supported by the through hole seal 169. Specifically, a periphery of the hole 167 in the TFT substrate 161 and a periphery of the hole 168 in the opposite substrate 162 are supported by the through hole seal 169.

Referring back to FIG. 2, the backlight 180 includes a prism sheet 181, a diffusion plate 182, a light source unit 183, and a reflection plate 184 in a stacking manner. The backlight 180, which is disposed on the back surface side of the display panel 11, irradiates a display area of the display panel 11 with light therefrom. The backlight 180 has a backlight through hole 186 formed therein. The prism sheet 181, the diffusion plate 182, the light source unit 183, and the reflection plate 184 have their respective through holes 186a formed in advance. The backlight through hole 180 can be formed by aligning the through holes 186a respectively formed in the prism sheet 181, the diffusion plate 182, the light source unit 183, and the reflection plate 184 so as to making one through hole by stacking the prism sheet 181, the diffusion plate 182, the light source unit 183, and the reflection plate 184. Thus, by forming the respective through holes 168a in advance for the prism sheet 181, the diffusion plate 182, the light source unit 183, and the reflection plate 184, respectively, it is possible to reduce or suppress the increase in the number of manufacturing processes for fabricating the backlight 180.

In the present embodiment, the light source unit 183 includes a light-emitting diode (LED) 183a as a light source, and a light guide plate 183b to guide the light emitted from the LED 183a. As illustrated in FIG. 2, the frame 190 is formed into a cylindrical shape having an opened front face and an outer circumferential wall 191. A through hole 190a is formed in a bottom surface of the frame 190. In the display device 10, the display panel 11 and the backlight 180 are accommodated in the outer circumferential wall 191 of the frame 190. In the display device 10, the through hole H of the display panel 11, the backlight through hole 186 of the backlight 180, and the through hole 190a of the frame 190 are in a continuous state to form one through hole together.

As illustrated in FIG. 2, a movement mechanism 150 includes a motor 3 and an indicator needle 2 rotated by the motor 3 via a shaft 152. The shaft 152 of the motor 3 is attached to the indicator needle 2 at the end 2TA. Thus, in the present embodiment, the motor 3 directly rotates the indicator needle 2. Thereby, the shaft 152 of the motor 3 has a rotational center aligned with the rotational axis Zr of the indicator needle 2. The movement mechanism 150 may decrease or increase a rotational speed of the shaft 152 of the motor 3 to be transmitted to the indicator needle 2.

The display device 10 is formed by combining the display panel 11 and the movement mechanism 150 with each other. The motor 3 of the movement mechanism 150 is disposed on the back surface side of the frame 190 in which the display panel 11 and the backlight 180 are accommodated. The shaft 152 of the movement mechanism 150 is inserted through the through hole H of the display panel 11, the backlight through hole 186 of the backlight 180, and the through hole 190a of the frame 190. With such a configuration, the indicator needle 2 of the movement mechanism 150 is disposed on the side of the image display surface PA of the display panel 11.

1-2. Display Device

Figure 4:
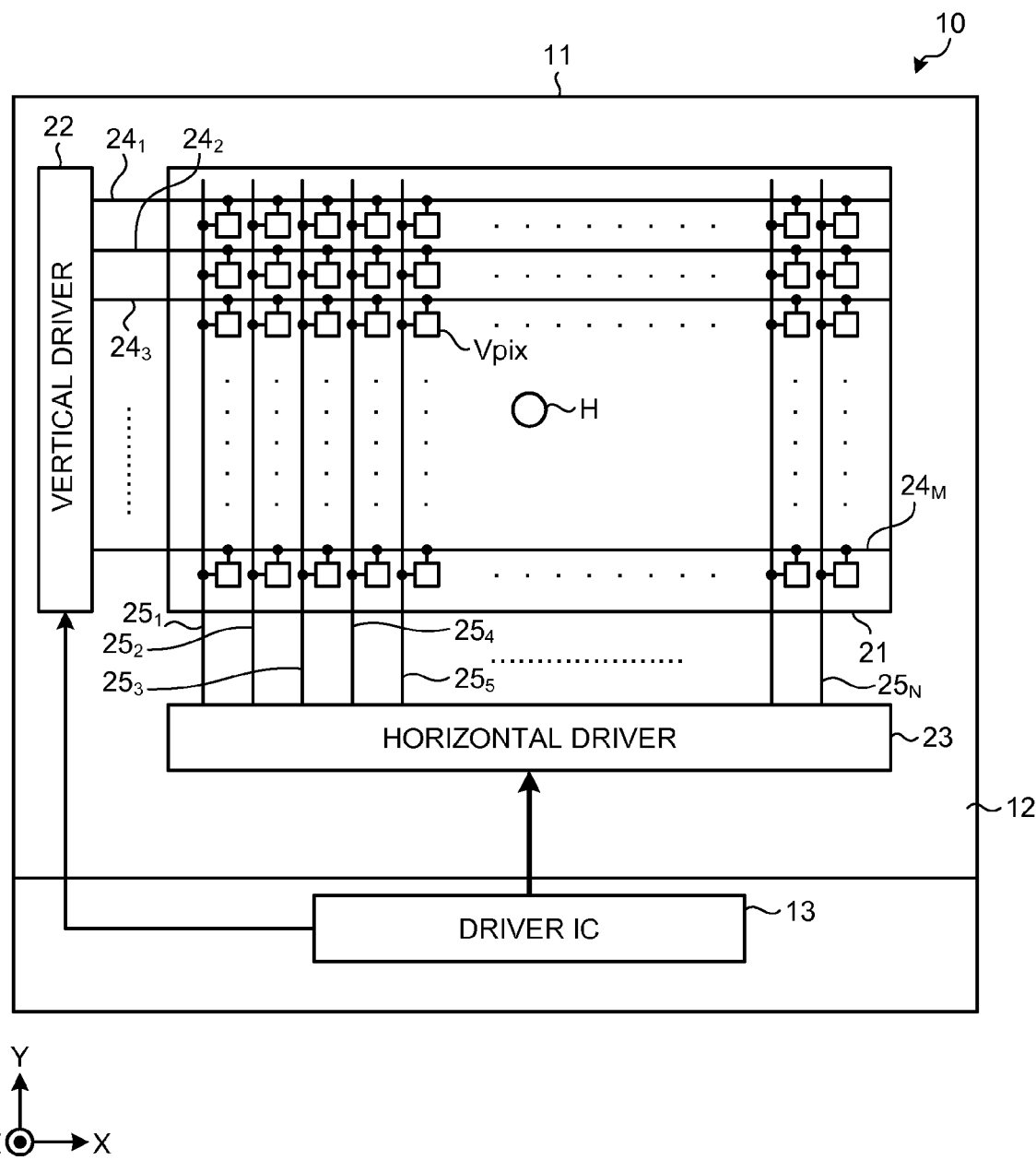
FIG. 4 is a schematic view illustrating a display device according to the present embodiment.

FIG. 4 is a schematic view illustrating a display device according to the present embodiment. In the present embodiment, the display device 10 is a transmissive liquid crystal display device. The display device 10 may be a transflective liquid crystal display device. The display device 10 includes the display panel 11 and the driver IC 13. The FPC (not illustrated) transmits to the driver IC 13, an external signal for the driver IC 13 and a drive power for driving the driver IC 13. The display panel 11 includes a translucent insulation substrate such as glass substrate 12, a display area region 21 existing on a surface of the glass substrate 12 in which a plurality of pixels each including a liquid crystal cell is arrayed in a matrix, a horizontal driver (a horizontal drive circuit) 23, and a vertical driver (a vertical drive circuit) 22.

The glass substrate 12 includes a first substrate and a second substrate. On the first substrate, the plurality of pixel circuits each including an active element such as transistor or TFT is arrayed in the matrix. The second substrate is disposed opposed to the first substrate with a predetermined gap therebetween. In the present embodiment, the first substrate is the TFT substrate 161 as mentioned above. In the present embodiment, the second substrate is the opposite substrate 162 as mentioned above. The gap between the first and second substrates is kept at a predetermined gap by photospacers disposed at predetermined positions on the first substrate. The liquid crystal is sealed between the first and second substrates.

The display panel 11 includes, on the glass substrate 12, the display area region 21, the driver IC 13, the vertical driver 22, and the horizontal driver 23. The driver IC 13 has an interface (I/F) function and a timing generator function.

The display area region 21 has a matrix structure in which a plurality of units is arrayed in a matrix of M row by N column. Each unit corresponds to one pixel in a display. One pixel corresponds to a pixel Vpix including the liquid crystal layer. In the present embodiment, the row direction is an X direction and the column direction is a Y direction. Herein, the row means a pixel row having N pixels Vpix aligned in one direction, and the column means a pixel column having M pixels Vpix aligned in a direction orthogonal to the row direction.

Values of M and N are determined depending on a display resolution in the vertical direction and a display resolution in the horizontal direction. In the display area region 21, scanning lines $24_1, 24_2, 24_3, \ldots, 24_M$ are extending line by line in the row direction, and signal lines $25_1, 25_2, 25_3, \ldots, 25_N$ are extending line by line in the column direction, in the matrix of M rows by N columns for Vpix. Hereinafter, in the present embodiment, the scanning lines $24_1, 24_2, 24_3, \ldots, 24_M$ may be collectively called scanning lines 24 and the signal lines $25_1, 25_2, 25_3, \ldots, 25_N$ may be collectively called signal lines 25. In the present embodiment, any three of the scanning lines $24_1, 24_2, 24_3, \ldots, 24_M$ are referred to as $24_m, 24_{m+1}$, and $24_{m+2}$ (m is a natural number satisfying a relation of m≤M−2) and any three of the signal lines $25_1, 25_2, 25_3, \ldots, 25_N$ are referred to as $25_n, 25_{n+1}$, and $25_{n+2}$ (n is a natural number satisfying a relation of n≤N−2).

External signals including a master clock, a horizontal synchronization signal, and a vertical synchronization signal are input to the display device 10 from outside and are supplied to the driver IC 13. The driver IC 13 generates a vertical clock appropriate for the liquid crystal panel and supplies the generated vertical clock to the vertical driver 22. The driver IC 13 also generates image data and a horizontal clock appropriate for the liquid crystal panel and supplies the generated image data and horizontal clock to the horizontal driver 23. The driver IC 13 generates a common potential (an opposite electrode potential) and supplies the generated common potential to the display area region 21. The common potential is an electric potential to be commonly supplied to drive electrodes for each pixel Vpix.

The vertical driver 22 performs voltage conversion appropriate for the TFTs on the basis of the vertical clock supplied from the driver IC 13, generates a signal for switching ON/OFF the TFTs, and sequentially supplies the signal to the scanning lines $24_m$, $24_{m+1}$, and $24_{m+2}$, ... of the display area region 21, thereby selecting the pixels Vpix row by row. The vertical driver 22 outputs a selection signal. For example, as for the scanning lines $24_m$, $24_{m+1}$, and $24_{m+2}$, ... in the display area region 21, the selection signal is sequentially output from a vertical scanning upper direction to a vertical scanning lower direction. Alternatively, the selection signal may be sequentially output from the vertical scanning lower direction to the vertical scanning upper direction. Herein, the vertical scanning upper direction means an upper side in the display area region 21 including the scanning lines $24_m$, $24_{m+1}$, and $24_{m+2}$. Similarly, the vertical scanning lower direction means a lower side in the display area region 21 including the scanning lines $24_m$, $24_{m+1}$, and $24_{m+2}$. Usually, this function of the vertical driver 22 may be incorporated into the driver IC 13.

The horizontal driver 23 converts the image data (digital data) supplied from the driver IC 13 into a voltage appropriate for the liquid crystal and outputs the voltage to pixels in the display area. For example, 6-bit R (red), G (green), and B (blue) digital video data Vsig is supplied to the horizontal driver 23. The horizontal driver 23 converts the digital data into a voltage appropriate for a liquid crystal display. The image data output from the horizontal driver 23 is written via the signal line 25 on the pixels Vpix in a row selected by vertical scan of the vertical driver 22.

In the display device 10, a specific resistance (a resistance value specific to material) or the like of the liquid crystal may be deteriorated because of a continuous application of DC voltage of the same polarity to liquid crystal elements. To prevent such deterioration of the specific resistance or the like of the liquid crystal, the display device 10 adopts a driving method of inverting a polarity of a video signal at predetermined intervals on the basis of the common potential of the drive signal. This is realized by a voltage output from the horizontal driver 23. Usually, this function of the horizontal driver 23 may be incorporated into the driver IC 13.

As the driving method of a liquid crystal display panel, a line inversion driving method, a dot inversion driving method, a frame inversion driving method, and the like are known. In the line inversion driving method, the polarity of a video signal is inverted with a time period of 1H (H is a horizontal period) corresponding to one line (one pixel row). In the dot inversion driving method, the polarities of video signals for upper and lower pixels and right and left pixels adjacent to each other are alternately inverted. In the frame inversion driving method, the polarities of video signals written on all pixels in each frame corresponding to one screen are inverted in a lump to be the same. The display device 10 can adopt any of the driving methods.

Figure 5:
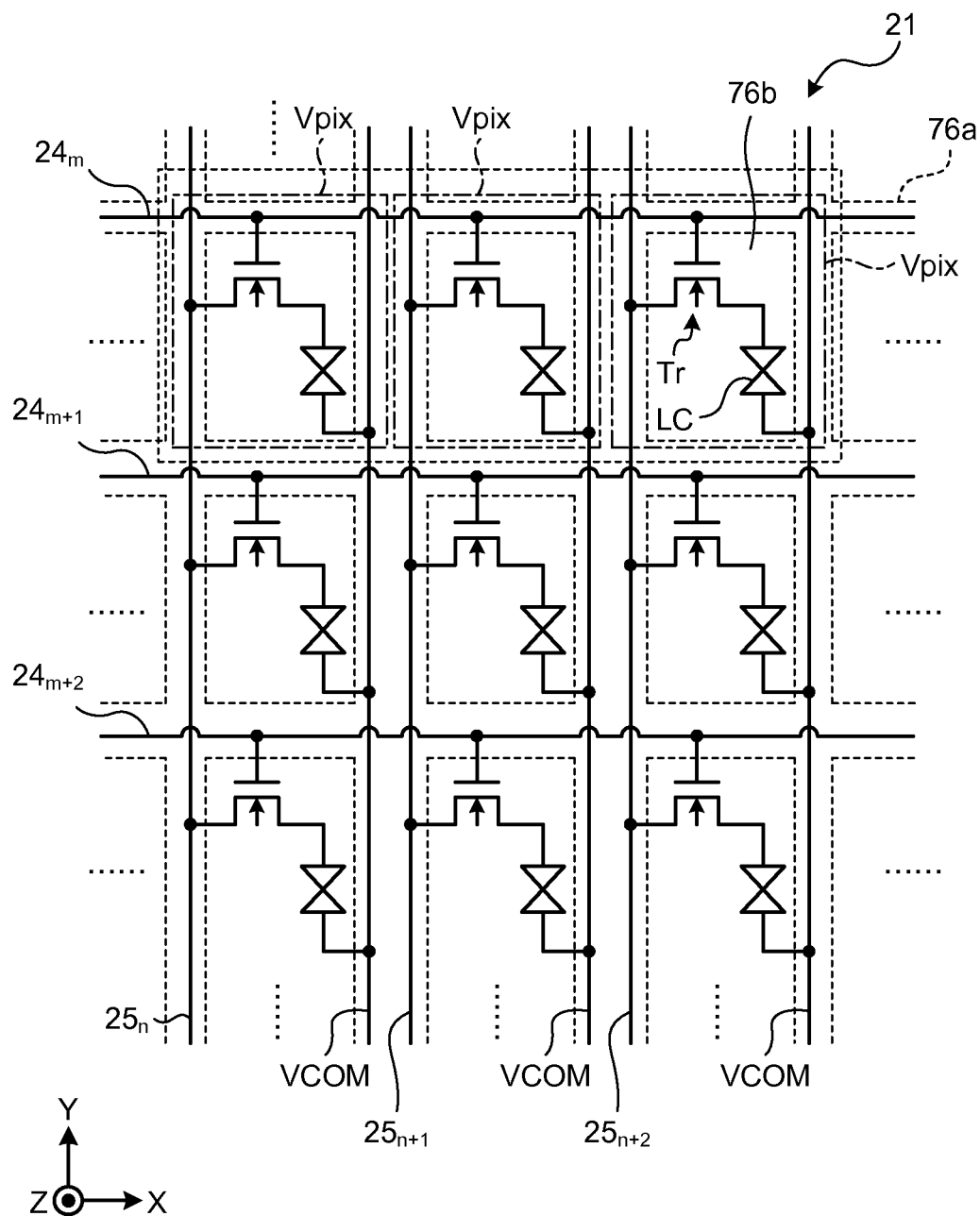
FIG. 5 is a circuit diagram illustrating a drive circuit to drive pixels of the display device according to the present embodiment.

FIG. 5 is a circuit diagram illustrating a drive circuit to drive pixels of the display device according to the present embodiment. In the display area region 21, wirings such as the signal lines $25_n$, $25_{n+1}$, and $25_{n+2}$ that supply a pixel signal as display data to the TFT elements Tr of the corresponding pixels Vpix and the scanning lines $24_m$, $24_{m+1}$, and $24_{m+2}$ that drive the TFT elements Tr, respectively, are formed. Each of the pixels Vpix includes the TFT element Tr and a liquid crystal LC. The TFT element Tr is comprised of a TFT. In this example, an n-channel MOS (Metal Oxide Semiconductor) TFT is used. One of a source and a drain of each TFT element Tr is connected to corresponding one of the signal lines $25_n$, $25_{n+1}$, and $25_{n+2}$, respectively. A gate of each TFT element Tr is connected to corresponding one of the scanning lines $24_m$, $24_{m+1}$, and $24_{m+2}$, respectively. The other of the source and the drain of each TFT element Tr is connected to the corresponding one of pixel electrodes (not illustrated). Owing to an electric field generated by a pixel electrode and a common electrode VCOM, the liquid crystal LC is aligned in a direction along the electric field.

Each pixel Vpix is connected to other pixels belonging to the same row in the display area region 21 via the corresponding one of scanning lines $24_m$, $24_{m+1}$, and $24_{m+2}$. The scanning lines $24_m$, $24_{m+1}$, and $24_{m+2}$ are connected to the vertical driver 22. A vertical scan pulse Vgate of a scan signal is supplied to each scanning line 24 from the vertical driver 22. Similarly, each pixel Vpix is connected to other pixels belonging to the same column in the display area region 21 via the corresponding one of signal lines $25_n$, $25_{n+1}$, and $25_{n+2}$. The signal lines $25_n$, $25_{n+1}$, and $25_{n+2}$ are connected to the horizontal driver 23 and are supplied with respective pixel signals from the horizontal driver 23. The common electrode VCOM is connected to the driver IC 13 illustrated in FIG. 1 and is supplied with a drive signal from the driver IC 13.

The vertical driver 22 illustrated in FIG. 4 applies the vertical scan pulse Vgate to the gates of the TFT elements Tr of the pixels Vpix via one of the scanning lines $24_m$, $24_{m+1}$, and $24_{m+2}$ illustrated in FIG. 5. With this operation, the vertical driver 22 sequentially selects one row (one horizontal line) among the pixels Vpix formed in a matrix in the display area region 21 as a display drive target. The horizontal driver 23 illustrated in FIG. 4 applies the pixel signal to the pixels Vpix including one horizontal line sequentially selected by the vertical driver 22 via the signal lines $25_n$, $25_{n+1}$, and $25_{n+2}$ illustrated in FIG. 5, respectively. The pixels Vpix hold therein the supplied pixel signal during a selection period and hold the pixel signal therein also during a period other than the selection period until the next frame.

As mentioned above, the display device 10 controls the vertical driver 22 to sequentially scan the scanning lines $24_m$, $24_{m+1}$, and $24_{m+2}$, thereby sequentially selecting one horizontal line. In the display device 10, the horizontal driver 23 supplies the pixel signals to the pixels Vpix belonging to one horizontal line, thereby changing a display of each horizontal line (line by line).

The display area region 21 has a color filter. The color filter includes a black matrix 76a formed in a grid shape and an opening region 76b corresponding to the pixels Vpix. The opening region 76b includes color areas which are colored, for example, in three colors of red (R), green (G), and blue (B), respectively. The color filter may include a white area or may be of other color combination, as long as the color areas are colored in different colors.

The black matrix 76a is formed to encompass outer peripheries of the pixels Vpix illustrated in FIG. 5. That is, the black matrix 76a is disposed at borders between two-dimensionally arrayed adjacent pixels Vpix and Vpix to have the grid shape. Thereby, light leakage from the gap between adjacent pixels Vpix and Vpix can be prevented. Thereby, it is possible to prevent the deterioration of the contrast. The black matrix 76a is formed of a material having a high optical absorptance, such as chromium metal (Cr), chromium oxide ($CrO_2$), a resin and the like. Thus, the black matrix 76a is a light shielding layer to suppress transmission of light. The opening region 76b is an opening formed in the grid shape of the black matrix 76a and is arranged to correspond to the pixels Vpix.

The opening region 76b includes the color areas which are colored, for example, in three colors of red (R), green (G), and blue (B). In the color filter, the color areas of the color filter colored, for example, in three colors of red (R), green (G), and blue (B), respectively, are periodically arrayed in the opening region 76b, so that the color areas in the three colors of R, G, and B are associated with the pixels Vpix illustrated in FIG. 5, respectively, with regularity.

When the display area region 21 is viewed from a direction orthogonal to the front surface, the scanning line 24 and the signal line 25 are disposed in areas overlapping with the black matrix 76a of the color filter. That is, when the display area region 21 is viewed from the direction orthogonal to the front surface, the scanning line 24 and the signal line 25 are hidden behind the black matrix 76a. In the display area region 21, an area in which the black matrix 76a is not disposed is the opening region 76b.

1-3. Details of Meter Control Device

Figure 6:
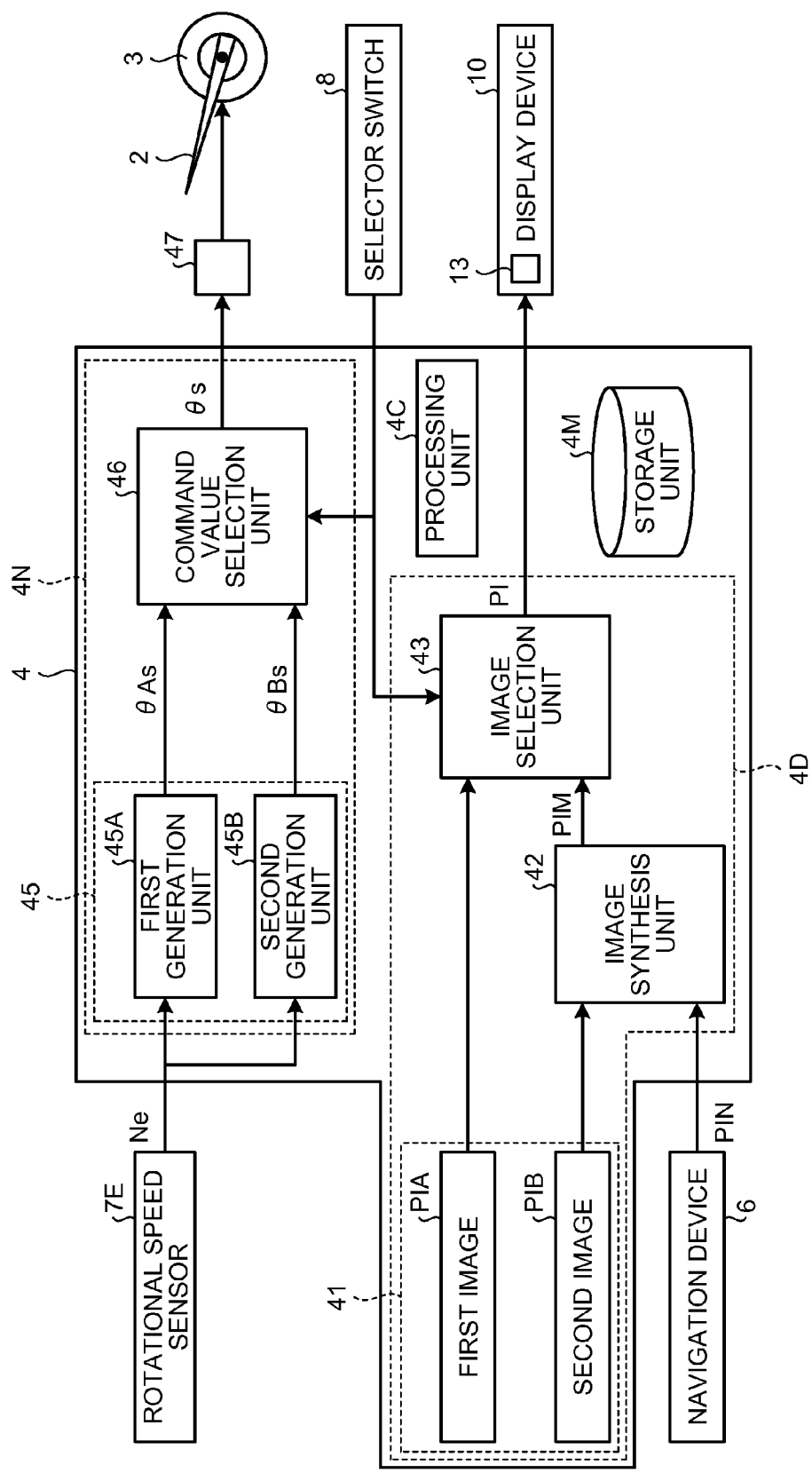
FIG. 6 is a block diagram illustrating the meter control device to control the vehicle meter according to the present embodiment.

FIG. 6 is a block diagram illustrating the meter control device to control the vehicle meter according to the present embodiment. The meter control device 4 mentioned above is explained in more detail with reference to FIG. 6. The meter control device 4 includes a processing unit 4C, a storage unit 4M, the display control unit 4D, and the indicator needle control unit 4N. The processing unit 4C controls operations of an image selection unit 43 and a command value selection unit 46 explained later and determines various conditions. The storage unit 4M stores therein a computer program in which commands for the processing unit 4C to execute processes are described, data required for the processes performed by the processing unit 4C, and the like.

The display control unit 4D includes an image generation unit 41, an image synthesis unit 42, and the image selection unit 43. An image (an image signal) PIN from the navigation device 6 is input to the image synthesis unit 42 of the display control unit 4D. The image PIN is a guiding image generated by the navigation unit 6. The image PIN to be input to the image synthesis unit 42 is not limited to an image from the navigation device 6. It may be, for example, an image captured by a rear-view monitor, an outside air temperature, a setting temperature of an air conditioner, or the like.

The image generation unit 41 generates a first image (a first image signal) PIA and a second image (a second image signal) PIB. These images are explained later. The image synthesis unit 42 synthesizes the image signal PIN and the second image signal PIB to generate a synthesized image (a synthesized image signal) PIM. The synthesized image PIM is input to the image selection unit 43. The first image PIA is also input to the image selection unit 43.

The selector switch 8 is connected to the image selection unit 43. On the basis of an instruction transmitted from the selection switch 8 for switching a display on the display device 10, the image selection unit 43 selects either one of the input first image PIA and the input synthesized image PIM, as a display image (a display image signal) PI to be displayed on the display device 10, and outputs the selected image to the driver IC 13 of the display device 10. On the basis of the display image signal PI, the driver IC 13 displays the display image PI on the display device 10 by controlling the vertical driver 22 and the horizontal driver 23 illustrated in FIG. 4. In the present embodiment, the image selection unit 43 is a switch, which is realized by hardware, for selecting one of two inputs and outputting the selected input. The image selection unit 43 is not limited to the hardware and the function of the image selection unit 43 may be realized by software.

The indicator needle control unit 4N is explained next. The indicator needle control unit 4N includes a command value generation unit 45 and the command value selection unit 46. An output of a rotational speed sensor 7E is input to the command value generation unit 45. The rotational speed sensor 7E is a sensor to detect a rotational speed Ne of an engine mounted on a vehicle, that is, the number of revolutions per unit time, the number of revolutions per minute in the present embodiment. On the basis of the rotational speed Ne input from the rotational speed sensor 7e, the command value generation unit 45 generates a command value on an angle (an angle command value) to rotate the indicator needle 2 around the rotational axis Zr.

The command value generation unit 45 includes a first generation unit 45A and a second generation unit 45B. The first generation unit 45A generates a first angle command value θAs for the indicator needle 2 corresponding to the first image PIA. The second generation unit 45B generates a second angle command value θBs for the indicator needle 2 corresponding to the second image PIB. The first angle command value θAs and the second angle command value θBs are input to the command value selection unit 46. The selector switch 8 is connected to the command value selection unit 46.

In the present embodiment, the first generation unit 45A and the second generation unit 45B are arithmetic circuits to convert the rotational speed Ne as an input into an angle for rotating the indicator needle 2, i.e. a command value to the motor 3 for rotating the indicator needle 2. In the present embodiment, the first generation unit 45A and the second generation unit 45B are arithmetic circuits, which are realized by hardware. The aforementioned function of the first and second generation units 45A and 45B may be realized by software.

On the basis of the command transmitted from the selector switch 8 for switching the display on the display device 10, the command value selection unit 46 selects either one of the first angle command value θAs and the second angle command value θBs which are input thereto, as an actual command value on an angle (an actual angle command value) θs for actually rotating the indicator needle 2. The command value selection unit 46 outputs the actual angle command value θs obtained as such to a driver 47 of the motor 3. On the basis of the actual angle command value θs, the driver 47 drives the motor 3 to rotate the indicator needle 2 by an angle corresponding to the rotational speed Ne of the engine. In the present embodiment, the command value selection unit 46 is a switch, which is realized by hardware, for selecting one from two inputs and outputting the selected one. However, the command value selection unit 46 is not limited to hardware. The function of the command value selection unit 46 may be realized by software. The first image PIA and the second image PIB are explained next.

Figure 7:
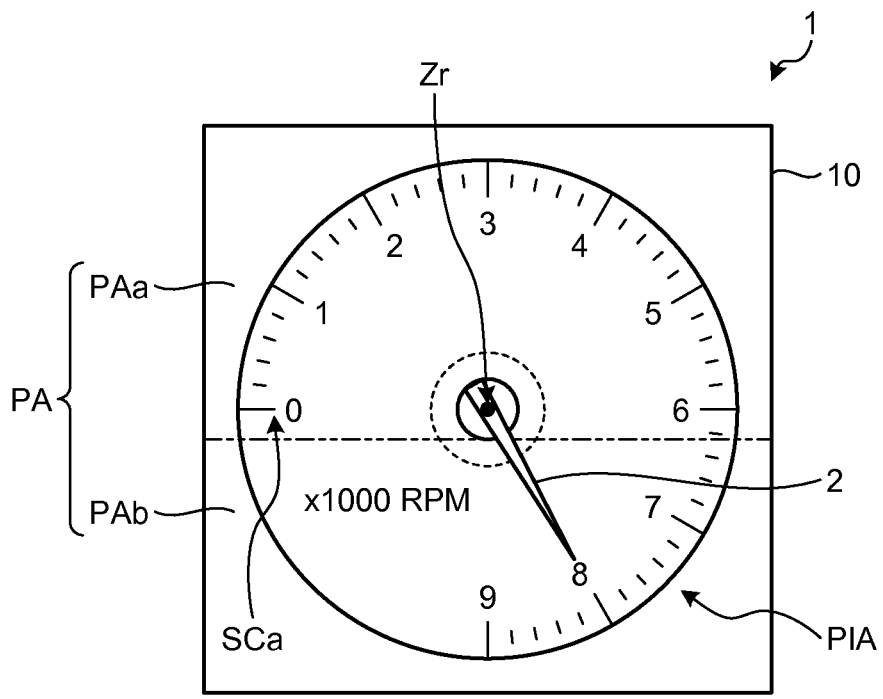
FIG. 7 is a schematic view illustrating an example of the first image.
Figure 8:
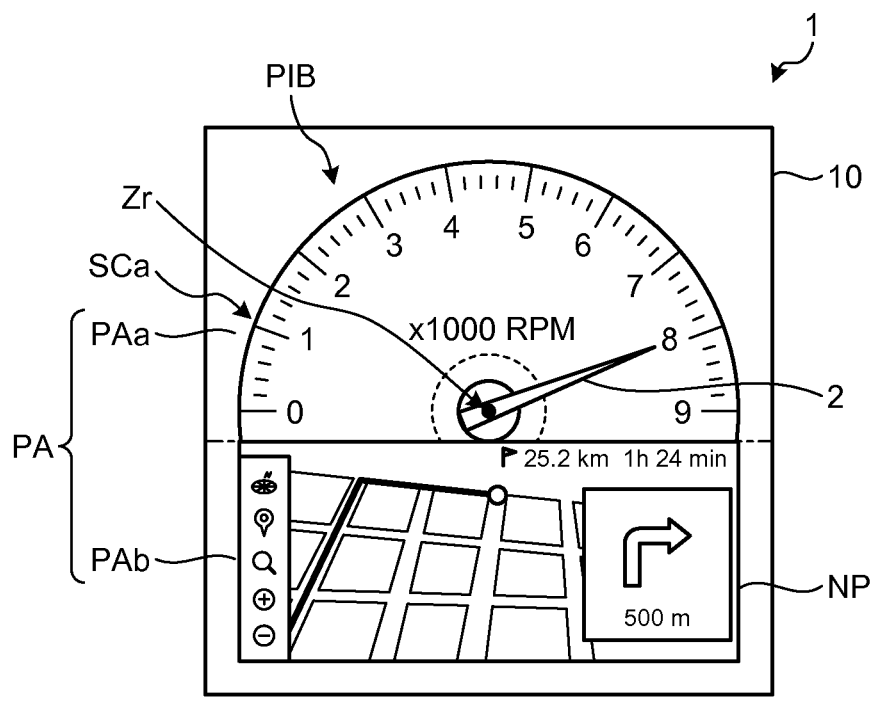
FIG. 8 is a schematic view illustrating an example of the second image.

FIG. 7 is a schematic view illustrating an example of the first image. FIG. 8 is a schematic view illustrating an example of the second image. The following explanation will be focused on a case where the vehicle meter 1 is a tachometer for indicating the information of the rotational speed Ne of the engine. However, the vehicle meter 1 is not limited to tachometers. For example, the vehicle meter 1 may be a speed meter for indicating a running speed of the vehicle.

Each of the first image PIA illustrated in FIG. 7 and the second image PIB illustrated in FIG. 8 is an image of scale marks SCa displayed on the display device 10 of the vehicle meter 1. The first image PIA and the second image PIB are images as tachometers. The first image PIA indicates the rotational speed Ne with the scale marks SCa pointed by the indicator needle 2. The first image PIA is displayed on the entire image display surface PA of the display device 10, that is, over both of the first display area PAa and the second display area PAb. In this example, the first image PIA displays the plurality of scale marks SCa in a range whose central angle around the rotational axis Zr of the indicator needle 2 is about 270 degrees. Once the first image PIA is displayed, the indicator needle 2 rotates in the area whose central angle around the rotational axis Zr is about 270 degrees and in which the plurality of scale marks SCa is displayed.

The second image PIB illustrated in FIG. 8 also indicates the rotational speed Ne with the scale marks SCa pointed by the indicator needle 2, similarly to the first image PIA. However, the second image PIB displays the plurality of scale marks SCa in a range smaller than that of the first image PIA. Thereby, the range or area in which the second image PIB is displayed on the image display surface PA of the display device 10 is smaller than the range or area in which the first image PIA is displayed on the image display surface PA. In this example, the second image PIB displays the plurality of scale marks SCa in a range whose central angle around the rotational axis Zr of the indicator needle 2 is about 180 degrees. In this example, the second image PIB is displayed in the first display region PAa of the image display surface PA. Once the second image PIB is displayed, the indicator needle 2 rotates in an area whose central angle around the rotational axis Zr is about 180 degrees and in which the plurality of scale marks SCa is displayed.

A range of the rotational speed Ne of the engine displayed by the first image PIA is the same as a range of the rotational speed Ne of the engine displayed by the second image PIB. In this example, the first image PIA and the second image PIB both can indicate the rotational speed Ne in a range from 0 RPM (Revolution Per Minute) to 9000 RPM. Since the ranges for displaying the plurality of scale marks SCa are different between the first image PIA and the second image PIB, a distance between adjacent scale marks SCa in the second image PIB is smaller than that in the first image PIA.

Since the first image PIA displays 9000 RPM in the range whose central axis is about 270 degrees, 1000 RPM is displayed in a range whose central axis is about 30 degrees. Since the second image PIB displays 9000 RPM in the range whose central axis is about 180 degrees, 1000 RPM is displayed in a range whose central angle is about 20 degrees. Thereby, the angle for rotating the indicator needle 2 controlled by the indicator needle control unit illustrated in FIG. 6 is different between the first image PIA and the second image PIB, in order to indicate the same rotational speed Ne. In this example, the indicator needle control unit 4N rotates the indicator needle 2 by 30 degrees per 1000 RPM while the first image PIA is displayed, and by 20 degrees per 1000 RPM while the second image PIB is displayed. The first angle command value θAs generated by the first generation unit 45A of the command value generation unit 45 included in the indicator needle control unit 4N is for rotating the indicator needle 2 by 30 degrees per 1000 RPM. The second angle command value θBs generated by the second generation unit 45B of the command value generation unit 45 included in the indicator needle control unit 4N is for rotating the indicator needle 2 by 20 degrees per 1000 RPM.

As mentioned above, the ranges of the rotational speed Ne of the engine indicated by the first image PIA and the second image PIB are equal to each other. Thereby, a maximum range for rotating the indicator needle 2 is about 270 degrees while the first image PIA is displayed, and a maximum range for rotating the indicator needle 2 is about 180 degrees while the second image PIB is displayed.

Once the display control unit 4D switches an image to be displayed on the display device 10 between the first image PIA and the second image PIB, the indicator needle control unit 4N of the meter control device 4 changes a range for rotating the indicator needle 2 in synchronization with the image switching. In the present embodiment, the indicator needle control unit 4N controls the range for rotating the indicator needle 2 while the second image PIB is displayed to be smaller than the range for rotating the indicator needle 2 while the first image PIA is displayed. Thus, when the display control unit 4D changes the range for displaying the scale marks SCa, the range for rotating the indicator needle 2 is also changed in synchronization with the change of the range for displaying the scale marks Sca. As a result, the scale marks SCa and the indicator needle 2 can indicate the same information amount (the same range of the rotational speed Ne of the engine in this case) before and after these changes. Herein, a range for rotating the indicator needle 2 means a range within which the indicator needle can rotates around the rotational center (rotational axis Zr).

In the present embodiment, since the second image PIB is displayed in the first display area PAa of the image display surface PA, an image other than the second image PIB can be displayed in the second display area PAb. When the second image PIB is displayed on the display device 10, the display control unit 4D displays a different image from the scale marks SCa in a region other than the scale marks SCa, in the second display area PAb in this example. In the present embodiment, a guiding image NP from the navigation device 6 illustrated in FIG. 6 is displayed as the different image mentioned above. Thus, while displaying the rotational speed Ne of the engine as the information indicated by the scale marks SCa and the indicator needle 2, the display device 10 can the information different therefrom at the same time on the same image display surface PA. The information indicated by the first image PIA and the indicator needle 2 is the same as the information indicated by the second image PIB and the indicator needle 2. Thereby, even when the rotational speed Ne of the engine and other information are displayed on the same image display surface PA, the numerical range for indicating the rotational speed Ne of the engine is not changed. As a result, the user (e.g. a vehicle driver) can be aware of the rotational speed Ne of the engine by means of the indicator needle 2 with the scale marks SCa, even when the other information is displayed with the rotational speed Ne of the engine on the same image display surface PA at the same time.

When the rotational speed Ne of the engine or the running speed of the vehicle is indicated by an indicator needle, the rotational speed Ne or the running speed increases as the indicator needle rotates clockwise, in general. Thereby, the scale marks are provided to indicate values in an ascending order from the observer's left to the observer's right on the screen and to pass an upper part of the screen and the indicator needle rotates along the scale marks. In the present embodiment, in each of the first image PIA and the second image PIB, the scale marks SCa are provided to indicate values in an ascending order from the left side to the right side and to pass an upper part of the screen. The display control unit 4D displays the second image PIB on an upper part of the image display surface PA, that is, in the first display area PAa, so that a positional relation of the scale marks SCa and the rotational speed Ne indicated by the scale marks SCa is not greatly changed between the first image PIA and the second image PIB. Thereby, the user (e.g. the vehicle driver) can confirm the rotational speed Ne of the engine without greatly changing movement of eyes between the first image PIA and the second image PIB.

When the second image PIB and an image other than the second image PIB are displayed on the display device 10, positions of these images are not limited to those mentioned above. For example, the display control unit 4D may display the second image PIB in the second display area PAb and the guiding image NP as an image other than the second image PIB in the first display area PAa. The display control unit 4D may display the second image PIB on the observer's left side on the image display surface PA and the guiding image NP as an image other than the second image PIB on the observer's right side on the image display surface PA, for example.

1-4. Operation of Vehicle Meter

Figure 9:
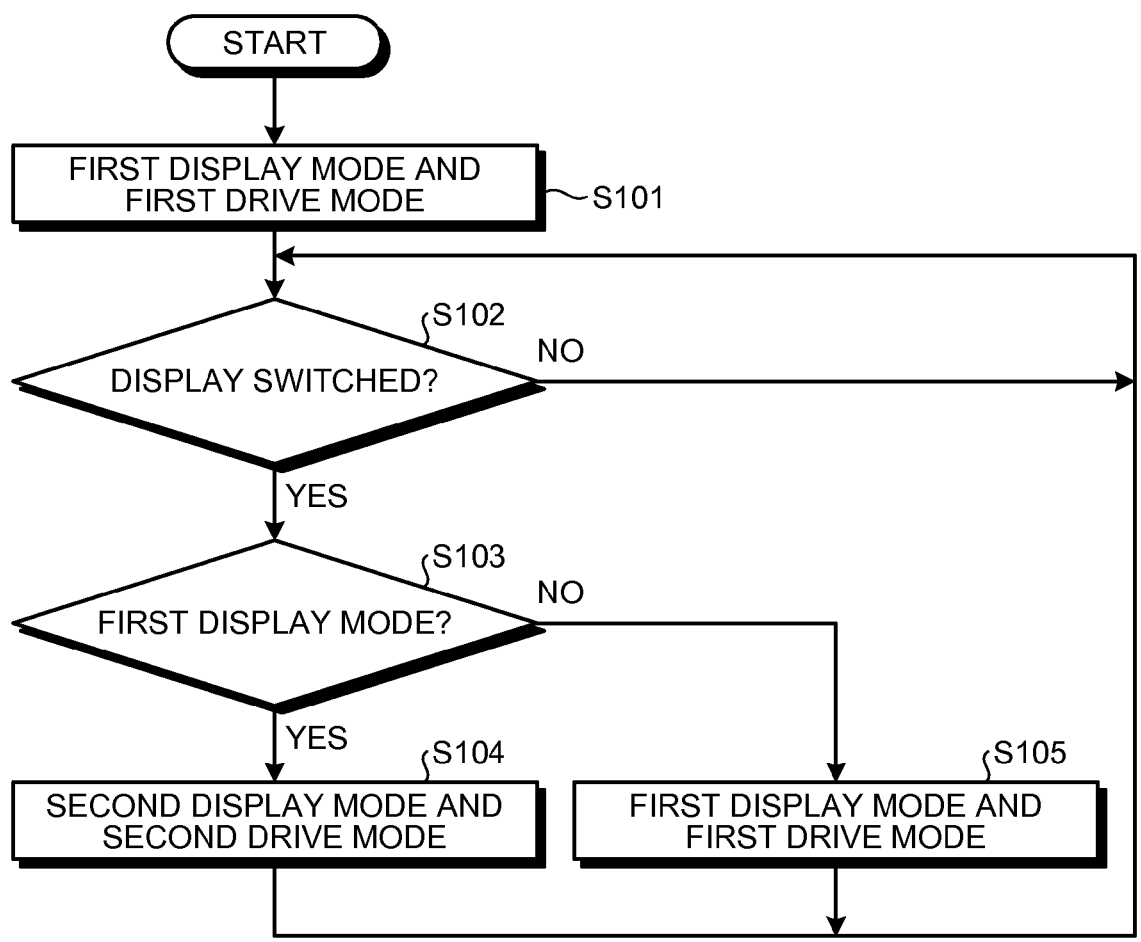
FIG. 9 is a flowchart illustrating an exemplary operation of the vehicle meter according to the present embodiment.

FIG. 9 is a flowchart illustrating an exemplary operation of the vehicle meter according to the present embodiment. In the following explanation, a mode where the display control unit 4D of the meter control device 4 displays the first image PIA on the display device 10 is referred to as "first display mode" and a mode where the display control unit 4D displays the second image PIB on the display device 10 is referred to as "second display mode".

The processing unit 4C of the meter control device 4 illustrated in FIG. 6 displays the first image PIA on the display device 10 in the first display mode at Step S101. In synchronization therewith, the indicator needle control unit 4N of the meter control device 4 rotates the indicator needle 2 in a first drive mode (Step S101).

At Step S102, when an instruction for switching a display mode of the display device 10 is generated through an operation of the selector switch 8 (YES at Step S102), the meter control device 4 proceeds the operation to Step S103. When the display control unit 4D is displaying the first image PIA on the display device 10 in the first display mode at Step S103 (YES at Step S103), the first image PIA is being displayed on the display device 10. In this case, the image selection unit 43 of the display control unit 4D of the meter control device 4 displays the second image PIB on the display device 10 in the second display mode at Step S104. The indicator needle control unit 4N of the meter control device 4 rotates the indicator needle 2 in a second drive mode in synchronization with a timing when an image displayed on the display device 10 is switched from the first image PIA to the second image PIB. The second drive mode is a drive mode for rotating the indicator needle 2 correspondingly to the display range of the scale marks SCa in the second image PIB.

After Step S104, the processing unit 4C of the meter control device 4 returns the operation to Step S102 to determine an instruction for switching the display mode.

A case where determination at Step S102 is negative (NO) is explained next. When an instruction for switching a display mode of the display device 10 is not generated at Step S102 (No at Step S102), the processing unit 4C of the meter control device 4 repeats the process at Step S102 to determine whether a switching instruction exists until an instruction for switching the display mode is generated at Step S102.

A case where determination at Step S103 is negative (NO) is explained next. When the display control unit 4D is not displaying the first image PIA on the display device 10 in the first display mode (NO at Step S103), the second image PIB is being displayed on the display device 10. In this case, the image selection unit 43 of the display control unit 4D of the meter control device 4 displays the first image PIA on the display device 10 in the first display mode at Step S105. The indicator needle control unit 4N of the meter control device 4 rotates the indicator needle 2 in the first drive mode in synchronization with a timing when an image displayed on the display device 10 is switched from the second image PIB to the first image PIA. The first drive mode is a drive mode for rotating the indicator needle 2 correspondingly to the display range of the scale marks SCa in the first image PIA.

After Step S105, the processing unit 4C of the meter control device 4 returns the operation to Step S102 to determine an instruction for switching the display mode.

In the present embodiment, a control process for the display device 10 is started from when the display device 10 is powered on by turning an ignition key or the like and then, for example, the first image PIA is displayed as an initial screen on the display device 10 in the first display mode. When the initial screen is the first image PIA, a tachometer can be displayed on the entire image display surface PA of the display device 10 at the same time as startup of the engine. Since a tachometer usually displays only a rotational speed Ne of an engine, the usual state can be prioritized.

The initial image is not limited to the first image PIA and may be the second image PIB. In the latter case, the meter control device 4 may switch the second image PIB to the first image PIA when the engine is started, so that the rotational speed Ne as one type of information indicating a state of the engine is preferentially displayed and the state of the engine is preferentially informed to the user (e.g. vehicle driver), for example.

As explained above, the vehicle meter 1 can display switchably (i) an image to provide the information indicated by the indicator needle 2 with the scale marks SCa as the first image PIA, and (ii) an image to provide the information indicated by the indicator needle 2 with the scale marks SCa as the second image PIB having the scale mark SCa display range narrower than that of the first image PIA and also provide the other information different from the meter indication value at the same time. As a result, it is possible to increase the level of convenience for the user. Since the indicator needle 2 is disposed within the image display surface PA of the display device 10, the scale marks SCa can be displayed on the entire image display surface PA when the first image PIA is displayed on the display device 10. As a result, when the information is indicated by the indicator needle 2 with the scale marks SCa, the vehicle meter 1 can effectively use the entire image display surface PA of the display device 10. This consequently enhances visibility of the user (e.g. vehicle driver).

Recently, many vehicles are provided with display devices for displaying image or video information such as navigation devices or rear-view monitors. However, it may be difficult to ensure spaces for installing these display devices in/on vehicles. The vehicle meter 1 can display the information indicated by the indicator needle 2 and the scale marks SCa as the second image PIB, simultaneously with the other information different therefrom on the same image display surface PA. Thereby, according to the present embodiment, the vehicle meter 1 can display various image information, without installing another display device such as navigation device or rear-view monitor for providing the image information. As a result, even when another new display device cannot be installed in the vehicle, the vehicle meter 1 can display the image information required for a navigation device, a rear-view monitor or the like on the display device 10 so that the user (e.g. vehicle driver) can visually recognize such information.

According to the present disclosure, there is provided a vehicle meter capable of displaying information indicated by scale marks and an indicator needle, and also capable of displaying information indicated by scale marks and the indicator needle simultaneously with the other information different from the information indicated by the scale marks and the indicator needle.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

2. Configuration of Present Disclosure

The present disclosure can employ the following configurations.

(1) A vehicle meter comprising:
a display device configured to display an image;
an indicator needle which is a rod-like member disposed on an image display surface side of the display device and which is configured to rotate around one end of the rod-like member along the image display surface;
a display control unit configured to switchably display one of a first image and a second image on the display device, the first image and the second image each including a plurality of scale marks at the other end side of the rod-like member, the plurality of scale marks being displayed within a range in a circumferential direction of a predetermined circle centered at a rotational axis of the indicator needle, the second image having the range in the circumferential direction narrower than that of the first image; and
an indicator needle control unit configured to control a range for rotating the indicator needle while the second image is displayed so as to be smaller than a range for rotating the indicator needle while the first image is displayed.

(2) The vehicle meter according to (1), further comprising:
a through hole passing through the image display surface and an opposite side surface of the display device;
a shaft mounted on the indicator needle at the one end side of the rod-like member through the through hole; and
an indicator needle drive device configured to rotate the indicator needle via the shaft.

(3) The vehicle meter according to (1), wherein
the display control unit displays other information different from the plurality of scale marks in a region different from the plurality of scale marks on the image display surface.

(4) The vehicle meter according to (3), wherein
the display control unit displays the plurality of scale marks of the second image in an upper region of the other information different from the plurality of scale marks.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A vehicle meter comprising:
a display device configured to display an image on a display surface including a first display area and a second display area adjacent to the first display area;
an indicator needle which is a rod-like member disposed on an image display surface side of the display device and which is configured to rotate around one end of the rod-like member along the image display surface;
a display control unit configured to display, on the display surface, alternatively one of a first image and a second image that has an area narrower than an area of the first image in a circumferential direction, the first image and the second image each including a plurality of scale marks at the other end side of the rod-like member, the plurality of scale marks being displayed within a range in a circumferential direction of a predetermined circle centered at a rotational axis of the indicator needle; and
an indicator needle control unit configured to control the indicator needle,
wherein the display control unit is configured to control to display:
in a first mode that the first image is displayed, only the first image over both of the first display area and the second display area; and
in a second mode that the second image is displayed, the second image only in the first display area and a third image in the second display area, the third image being different from the first image and the second image,
wherein the indicator needle control unit is configured to control the indicator needle in such a manner that a rotating range of the second image being displayed is smaller than a rotating range of the indicator needle of the first image being displayed,
wherein first information indicated by the first image and the indicator needle is the same as second information indicated by the second image and the indicator needle,
wherein a first maximum value and a first minimum value of the scale marks displayed in the first image are the same as a second maximum value and a second minimum value of the scale marks displayed in the second image, and
wherein a second distance between adjacent scale marks of the second image is smaller than a first distance between adjacent scale marks of the first image.

2. The vehicle meter according to claim 1, further comprising:
a through hole passing through the image display surface and an opposite side surface of the display device;
a shaft mounted on the indicator needle at the one end side of the rod-like member through the through hole; and
an indicator needle drive device configured to rotate the indicator needle via the shaft.

3. The vehicle meter according to claim 1,
wherein the second mode, the display control unit displays the plurality of scale marks of the second image in the first display area which is an upper region of the second display area.

* * * * *